United States Patent [19]

Dalrymple et al.

[11] Patent Number: 5,002,127
[45] Date of Patent: Mar. 26, 1991

[54] PLACEMENT AID FOR DUAL INJECTION PLACEMENT TECHNIQUES

[75] Inventors: Dwyann Dalrymple, Duncan, Okla.; Kenneth W. McKown, Pampa, Tex.; Frank A. Wood, Hays, Kans.

[73] Assignee: Halliburton Company, Duncan, Okla.

[21] Appl. No.: 486,635

[22] Filed: Feb. 27, 1990

[51] Int. Cl.⁵ .......................................... E21B 33/138
[52] U.S. Cl. .................................. 166/295; 166/285; 166/292; 166/294
[58] Field of Search .............. 166/269, 285, 292, 294, 166/295, 300

[56] References Cited

U.S. PATENT DOCUMENTS

| | | | |
|---|---|---|---|
| 2,728,395 | 12/1955 | Howard | 166/294 X |
| 3,088,520 | 5/1963 | Hildebrandt | 166/295 |
| 3,310,110 | 3/1967 | Martin | 166/294 X |
| 3,386,514 | 6/1968 | Weber | 166/294 X |
| 3,421,584 | 1/1969 | Eliers et al. | |
| 3,455,393 | 7/1969 | Bradley | 166/294 X |
| 3,705,627 | 12/1972 | Argabright et al. | 166/295 |
| 3,857,443 | 12/1974 | Cole | 166/295 |
| 3,876,006 | 4/1975 | Messenger | 166/293 |
| 4,009,755 | 3/1977 | Sandiford | 166/270 |
| 4,011,910 | 3/1977 | Rhudy et al. | 166/274 |
| 4,096,869 | 1/1978 | Sandiford | 166/270 |
| 4,157,116 | 6/1979 | Coulter | 166/294 X |
| 4,173,999 | 11/1979 | Messenger | 166/293 |
| 4,183,406 | 1/1980 | Lundberg et al. | 166/295 |
| 4,332,297 | 6/1982 | Sandiford | 166/270 |
| 4,397,353 | 8/1983 | Lacy | 166/281 |
| 4,460,627 | 7/1984 | Weaver et al. | 252/8.551 X |
| 4,476,931 | 10/1984 | Boles et al. | 166/294 |
| 4,542,791 | 9/1985 | Drake et al. | 166/291 |
| 4,730,674 | 3/1988 | Burdge et al. | 166/295 |
| 4,735,265 | 4/1988 | Hoskin et al. | 166/294 |
| 4,754,810 | 7/1988 | Bennett et al. | 166/253 |
| 4,760,882 | 8/1988 | Novak | 166/295 |
| 4,785,883 | 11/1988 | Hoskin et al. | 166/270 |
| 4,842,068 | 6/1989 | Vercaemer et al. | 166/294 X |

OTHER PUBLICATIONS

Paper No. 374032 titled "Influence of Production Rate and Oil Viscosity on Water Coning" by Flores, 1974.
Article title "Artificial Barriers May Control Water Coning-1", Oil and Gas Journal, Oct. 7, 1974.
Article titled "Artificial Barriers May Control Water Coning-2", Oil and Gas Journal, Oct. 14, 1974.
Article titled "Combat Water-Coning By Injecting Reverse-Wetting Additives", The Petroleum Engineer, Aug. 1957.
Halliburton No. 19 Brochure titled, "Halliburton Services Near Wellbore Fluid Control", 1-87.
Paper titled "Two Water Control Sealant System for Matrix & Channel Plugging" by Cole et al., 1978.

Primary Examiner—George A. Suchfield
Attorney, Agent, or Firm—David J. Alexander

[57] ABSTRACT

A method of controlling the permeability of underground well formations by the placement of a chemical barrier is provided. A first fluid and a second fluid are substantially simultaneously injected into the formation via a well bore wherein the first fluid generally contains either a viscosifying agent or a permeability reducing agent and the second fluid contains a sealant. As the two fluids extend radially from the well bore, the injection pressures of the first and second fluids are substantially balanced such that migration of the second fluid into portion of the formation occupied by the first fluid is inhibited.

20 Claims, 1 Drawing Sheet

PLACEMENT AID FOR DUAL INJECTION PLACEMENT TECHNIQUES

FIELD OF THE INVENTION

The present invention relates to methods and fluids for controlling the permeability of underground well formations. More particularly, but not by way of limitation, the present invention relates to a method of placing a chemical barrier adjacent the well bore at a selected depth in the formation.

BACKGROUND OF THE INVENTION

Hydrocarbon bearing formations are frequently underlaid by a water zone. In some instances, for example, the underlying water zone, due primarily to hydrostatic pressures, exerts an upwardly directional force upon hydrocarbons within the hydrocarbon bearing formation. Generally, the pooling of hydrocarbons responding to hydrostatic forces is referred to as a bottom water drive reservoir.

In these instances, upon penetrating the hydrocarbon bearing formation by a well bore, the hydrostatic forces enhance initial hydrocarbon production. However, as hydrocarbon production continues, encroachment of water into the hydrocarbon bearing formation adjacent the well bore, a process generally referred to as "water coning", occurs. It is generally thought that water coning is dependent on capillary forces of the formation at the water/oil interface and the presence of a low pressure area around the well bore caused by hydrocarbon production therethrough. Accelerated production rates or high hydrocarbon flow rates into the well bore enhance the onset of water coning. In some instances, advanced water coning may result in substantial quantities of water accompanying the producing hydrocarbons to the surface. In some instances, economics may dictate abandoning the well where high water to oil ratios (WOR) appear in production fluids.

Because water coning generally occurs in the immediate vicinity of the perforated well bore, traditional methods for alleviating the influx of water have involved alterations of the well bore or of the properties of the formation adjacent said well bore. Plugging the perforations producing water or cement squeezing have met with limited success. Methods involving the placement of a chemical barrier at the oil/water interface have produced more favorable results.

One particular method of placing a chemical barrier at the oil/water interface is commonly referred to as "dual injection". Dual injection is generally performed by lowering a retainer, such as a packer, by means of a drill string, into the well bore until the packer is positioned adjacent to, or slightly above the oil/water interface. After securing the packer within the well bore a compatible non-damaging, non-gelling fluid, generally referred to as the balancing fluid, and a sealant are simultaneous injected into the formation. Typical sealants include aqueous mixtures of silicates, delayed metal complex polyacrylamides, in situ polymerizable acrylamides, xanthans, epoxies, etc. Generally, the balancing fluids are aqueous compositions of either formation water or brine previously produced, formation crude oil, diesel fuel or synthetic brines containing either potassium chloride, ammonium chloride or sodium chloride.

The balancing fluid is pumped down the annulus between the treating string and the casing while a sealant is pumped down the treating string. The balancing fluid generally exits the well bore and enters the hydrocarbon bearing formation above the oil/water interface while the sealant enters said formation at or below said interface. Injection pressures are balanced such that both fluids are directed radially away from the well bore while generally maintaining a substantially horizontal interface between the balancing fluid and sealant. In this way, the balancing fluid forms a temporary radial barrier extending from the well bore into the formation that prevents sealant migration into the hydrocarbon bearing formation. Once the sealant has cured, the balancing fluid is back-produced and the well is returned to production.

Occasionally, formations adjacent the oil/water interface are very permeable. In these instances, the injection volume of balancing fluid must be increased to maintain pressure equilibration of the two fluids. In some instances, fluid loss to the formation is so great that equilibration between the injection pressures of the two fluids can not be maintained by increasing the injection rate of the balancing fluid. In these instances, the radial barrier of balancing fluid may not extend a sufficient distance from the well bore. This may result in inefficient sealant placement or the sealant migration into the hydrocarbon bearing formation. In other instances, increasing the balancing fluid injection volume may result in increased operational cost and a longer back-production interval upon returning the well on-line.

Thus, improvement in this area is needed to ensure adequate sealant coverage while minimizing the loss of balancing fluid to porous formations. Under high permeable formation conditions, it has been found that by incorporating a viscosifying agent or a permeability reducing agent into the balancing fluid, a reduction in the volume thereof while maintaining pressure equilibration between the sealant and balancing fluid is observed. The results are the creation of a more effective temporary radial pressure barrier extending from the well bore and efficient sealant placement without significant adverse migration.

SUMMARY OF THE INVENTION

The present invention relates to methods and fluids for controlling the permeability in a subterranean formation penetrated by a well bore. The method includes injecting a first fluid, also referred to as the balancing fluid, through the well bore into the formation. The first fluid is generally segregated from the second fluid in the well bore. In some instances, a portion of the first fluid may be injected into the formation prior to the injection of the second fluid, followed by the simultaneous injection of the remaining quantity of the first fluid with the second fluid.

The first fluid may be aqueous based or hydrocarbon based. For example only, and not by way of limitation, the first fluid may include polyacrylamides, guar gum, cellulose gels, hydrophilic branched polymers, aluminum complexes or caustic in combination with rosin acids or fatty acids. Increasing the viscosity of the first solution by the inclusion of one or more of these additives permits injection pressure equilibration with minimal loss of the first fluid to the formation.

A second fluid, also referred to as the sealant, is generally aqueous based and includes delayed silicate gel systems, delayed metal complexed aqueous polymers and in situ polymerization systems. As the injected first and second fluids migrate into the formation, migration of the second fluid through the portions of the formation occupied by the balanced pressure wave of the first fluid is substantially inhibited.

DESCRIPTION OF THE PREFERRED EMBODIMENTS

The present invention provides methods and fluids for controlling the permeability in a subterranean formation penetrated by a well bore by the placement of a chemical barrier adjacent the well bore at a selected depth in the formation. The preferred placement technique for employing the present invention is dual injection. FIGS. 1-4 schematically illustrate an example of the dual injection process.

Figure 1:
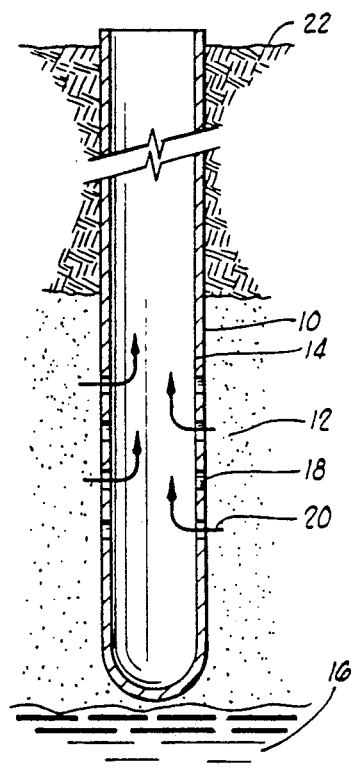
FIG. 1 is a vertical cross-sectional view of a well bore penetrating a subterranean oil producing formation.

Referring now to FIG. 1, a well bore 10, extending into a producing formation 12, is lined with a tubular casing 14. The casing 14 terminates in the producing formation 12 above the level of an aqueous zone 16. Portions of the casing 14 adjacent the producing formation 12 are provided with a plurality of spaced openings or perforations 18. Fluids 20, generally oil and gas, from the formation 12 enter the casing 14 and are ultimately produced to the surface 22.

Figure 2:
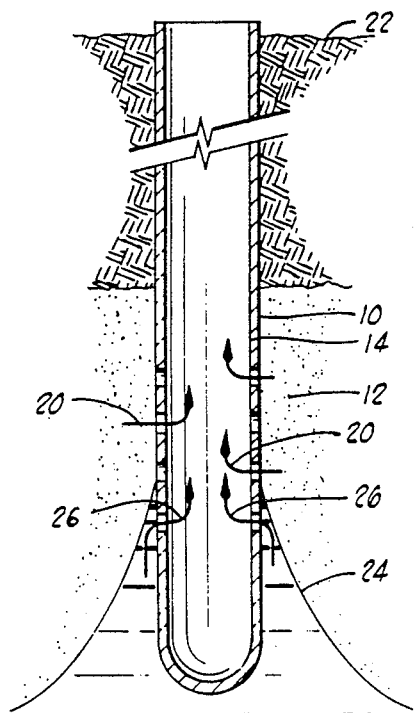
FIG. 2 is the view of FIG. 1, and illustrates water migration into and adjacent the well bore, a process referred to as "water coning".

Referring now to FIG. 2, as production continues through the casing 14, aqueous fluid from zone 16, generally water or brine, migrates upward and toward the well bore 10 forming a cone-shaped wave of aqueous fluid 24. As the wave 24 continues upward, the advancing portions thereof overlie portions of the perforated casing such that quantities of the aqueous fluid 26 enter the casing 14 through the perforations 18 and are co-produced to the surface 22 with fluids 20.

Figure 3:
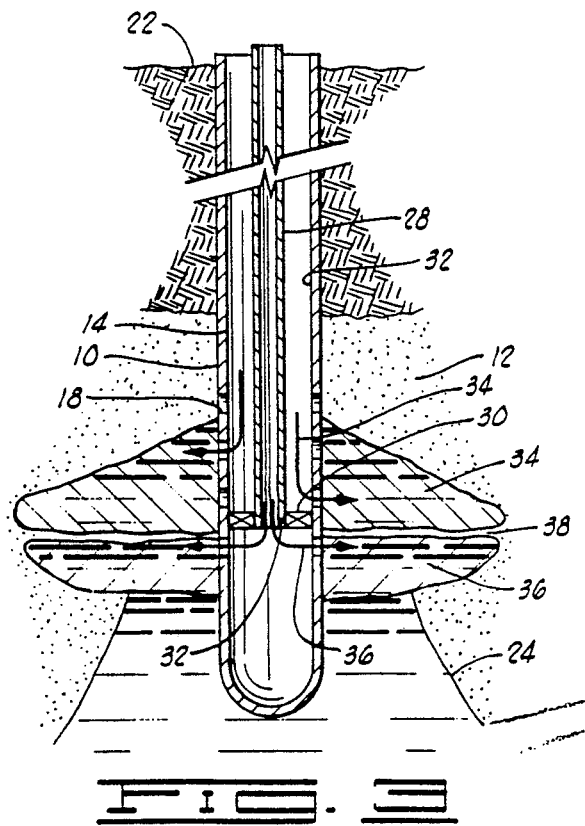
FIG. 3 is the view of FIG. 1, and illustrates radial injection of a first and a second fluid into the oil producing formation, a process referred to as "dual injection".
Figure 4:
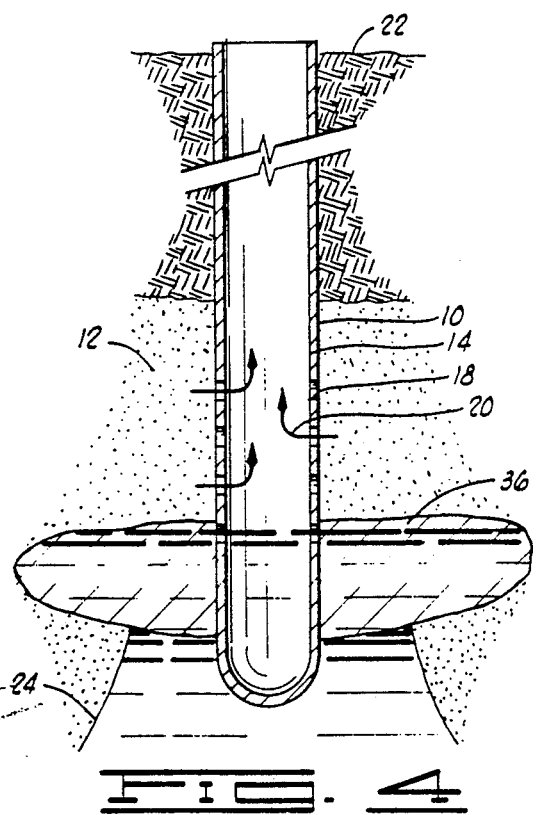
FIG. 4 is the view of FIG. 1, and illustrates a chemical barrier extending radially from the well bore.

The dual injection process, as shown in FIGS. 3 and 4, involves extending a tubular string 28, having a packer 30 secured to an end 32 thereof, into the casing 14. The packer 30 is secured within the casing 14 at a level generally adjacent the leading edge of the wave 24. An annulus 32, defined by the interior portion of the casing 14 and the external surface of the string 28, receives a first fluid 34 under pressure. The first fluid 34 is subsequently injected into the formation 12.

Substantially concurrent with the introduction of the first fluid 34 into the annulus 32, a second fluid 36 is introduced into the string 28. In this way, the first and second fluids, 34 and 36, remain separate as they travel within the well bore and enter the formation 12 substantially simultaneously. The first fluid 34 enters the formation 12 above the level of the second fluid 36.

It will be understood that, in some instances, the first fluid 34 may be injected into the formation below the level of the second fluid 36. This is accomplished by introducing the first fluid 34 into the string 28 and introducing the second fluid 36 into the annulus 32 (not shown).

The injection pressures of the first and second fluids, 34 and 36, are substantially balanced such that each fluid extends radially from the well bore 10 into the formation 12. The injection rates and pressures of the first and second fluids, 34 and 36, are generally maintained at a level below the parting pressure of the formation contacted by said fluids.

The first and second fluids, 34 and 36, which can be nonmiscible, form an interface 38 as the two fluids migrate into the formation. In this way, by substantially balancing the injection pressures of the first and second fluids, 34 and 36, migration of the second fluid 36 through portions of the formation occupied by the first fluid 34 is substantially inhibited. As a result of the injection pressure of the second fluid 36, radial migration of the second fluid 36 from the well bore 10 arrests further upward migration of the aqueous fluid 24.

After sufficient volumes of the first and second fluids, 34 and 36, have been injected into the formation, pressure on the formation is maintained until the second fluid 36 cures. As shown in FIG. 4, once the second fluid 36 has cured, the first fluid 34 is back-produced leaving a chemical barrier 40 that inhibits further co-production of the aqueous fluid 24.

The first fluid may be aqueous based or hydrocarbon based and include either a viscosifying agent or a permeability reducing agent. When the first fluid is aqueous based, an aqueous carrier fluid consisting of 2% KCl is preferred. "Viscosifying agent" as used herein means a composition, when present in the first fluid in sufficient quantities increases the viscosity thereof. "Permeability reducing agent" as used herein means a component of the first fluid that, when present in the first fluid in sufficient quantities, reduces the permeability of a formation contacted by said fluid to said fluid or similarly based fluids. Examples of viscosifying agents include hydratable polymers, aluminum complexes and/or caustic in combination with rosin acids or fatty acids and polyacrylamides. Examples of permeability reducing agents include polyacrylamides, and hydrophilic branched polymers. Polyacrylamides may function as both viscosity reducing agents and permeability reducing agents. As will be discussed in greater detail below, the hydrophilic branched polymer may be present in only a portion of the total quantity of the first fluid contacting the formation.

The hydratable polymers can include, in sufficient concentration and reactive position, one or more functional groups, such as, hydroxyl, cis-hydroxyl, carboxyl, sulfate, sulfonate, amino or amide. Particularly suitable polymers are polysaccharides and derivatives thereof which contain one or more of the following monosaccharide units: galactose, mannose, glucoside, glucose xylose, arabinose, fructose, glucuronic acid or pyranosyl sulfate. Natural hydratable polymers containing the foregoing functional groups and units include, but are not limited to, guar gum and derivatives thereof, locust bean gum, tara, konjak, tamarind, starch, cellulose and derivatives thereof, karaya xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol and polyvinylpyrrolidone.

Various compounds can be utilized with the above mentioned hydratable polymers in an aqueous solution to inhibit or retard the hydration rate of the polymers, and therefore, delay a viscosity increase in the solution for a required period of time. Depending upon the particular functional groups contained in the polymer, different inhibitors react with the functional groups to inhibit hydration. For example, inhibitors for cis-hydroxyl functional groups include compounds containing multivalent metals which are capable of releasing the metal ions in an aqueous solution, borates, silicates, and aldehydes. Examples of the multivalent metal ions are chrominum, zirconium, antimony, titanium, iron (ferric or ferrous), tin, zinc, and aluminum. Inhibitors for hydroxyl functional groups include mono- and di-functional aldehydes containing from about 1 to about 5 carbon atoms and multivalent metal salts that form hydroxide. Multivalent metal salts or compounds can be utilized as inhibitors for the hydroxyl functional groups. Inhibitors for amides include aldehydes and multivalent metal salts or compounds. Generally, any compound can be used as an inhibitor for a hydratable polymer if the compound reacts or otherwise combines with the polymer to crosslink, form a complex or otherwise tie-up the functional groups of the polymer whereby the rate of hydration of the polymer is retarded. The inhibitor, when present, is admixed with the aqueous liquid in an amount of from about 0.001 to about 10.0 percent by weight of the aqueous liquid.

Preferred hydratable polymers which increase the viscosity of the first fluid upon hydration therein, at a concentration range of from about 10 lbs/1000 gals of first fluid to about 80 lbs/1000 gals of first fluid are guar gum and guar derivatives such as hydroxypropyl guar, hydroxyethylguar, and carboxymethylguar, cellulose derivatives such as hydroxyethylcellulose, carboxymethylcellulose, and carboxymethylhydroxyethyl cellulose, locust bean gum, carrageenan gum and xanthan gum.

The aluminum complexes can include sodium aluminate and/or aluminum chloride sources. The aluminum complexes are generally admixed in a liquid hydrocarbon medium such as diesel oil, kerosene, and crude oil or a blend thereof. An aluminum chloride source and caustic blend may be combined with a fatty acid, such as alkyl phosphate ester acid, or rosin acid in a ratio of from about 1 part aluminate /caustic to about 1.18 parts alkyl phosphate ester or rosin acid. The aluminate/caustic may vary from about 1.8 gals. to about 6.8 gals per 1000 gals. of liquid hydrocarbon. The ratio of aluminum complex to caustic is from about 1 part aluminum complex to about 1.25 parts caustic to about 1 part aluminum complex to about 1 part caustic. The concentration range of alkyl phosphate ester acid per 1000 gals of liquid hydrocarbon is from about 2 gals to about 8 gals. In the absence of aluminum complex, the ratio of caustic to fatty acid or rosin acid is about 1 part of 50% caustic solution to about 3.5 parts fatty acid or rosin acid.

The polyacrylamide component of the first fluid can have a molecular weight of from about 500,000 to about 7 million and is generally admixed in an aqueous solution in a concentration range of from about 0.1% to about 1.0% weight of polyacrylamide to the weight of the first fluid. This aqueous solution may also include a salt or combinations of salts, such as potassium chloride, sodium chloride, ammonium chloride, and the like, in sufficient quantities such that said solution is compatible with the contacted formation. Examples of suitable polyacrylamides are Dow J-217, a product of Dow Chemical Corporation, and the like.

Hydrophilic branched polymers utilized in the first fluid can have a molecular weight of from about 1,000 to about 7 million and are generally admixed in an aqueous solution in a concentration range of from about 0.05% to about 2% weight of polymer to the weight of the first fluid. Larger quantities of said polymer can be employed, however such use is uneconomical. This aqueous solution may also include a salt or combinations of salts, such as potassium chloride, sodium chloride, ammonium chloride, and the like, in sufficient quantities such that said solution is compatible with the contacted formation.

Examples of suitable hydrophilic branched polymers are the compositions described in U.S. Pat. No. 4,476,931, assigned to Huges Tool Co., Houston, Tex., U.S. Pat. No. 4,460,627, assigned to Halliburton Co, Duncan, Okla. Other examples include PEI 1000, a polyethylenimine product of Dow Chemical, Aquatrol I, an amphoteric polymeric product of Huges Tool Co., and WOR-Con, a product of Halliburton Co.

When contacting a formation with a quantity of the first fluid, the hydrophilic polymers or any permeability reducing agent described above may be present in all of said quantity or in a portion of said quantity. When only a portion of the total quantity of first fluid to be injected into the formation contains hydrophilic polymers, the formation is preferably contacted with the portion containing the hydrophilic polymer first, a technique sometimes referred to as "preflushing" followed by the remainder of the first fluid. In this way, the formation can be either simultaneously contacted by the first and second fluids during the dual injection process or the formation can be pre-treated or preflushed by contact with a quantity of first fluid containing hydrophilic polymers followed by simultaneously injecting a quantity of first fluid, with or without said hydrophilic polymer present, with the second fluid. In both instances, substantial pressure equilibration is maintained during the simultaneous injection of the first fluid and the second fluid. It will be understood that the above described preflush process is equally applicable to a first fluid, or portion thereof containing a viscosifying agent.

The second fluid is generally aqueous based and includes known sealant systems such as delayed silicate gel systems, delayed metal complexed aqueous polymers, and in situ polymerization systems such as acrylamide, xanthan, and epoxy polymers. Commercially available sealant systems include Matrol and K-trol Services, products of Halliburton services.

To further illustrate, and not by way of limitation, the following examples of preparing the second fluid are provided:

EXAMPLE 1

To approximately 1,630 gals of fresh water is added 320 gals of sodium silicate (41.5 °Be) and 50 gals of HCl (1.160 specific gravity).

EXAMPLE 2

To approximately 1000 gals of fresh water is added 1 gal of surfactant (Tri-S), 150 lbs of sodium chloride, 50 lbs of buffering agent (sodium phosphate monohydrate monobasic), 18 gals of emulsion anionic polyacrylamide, 9 lbs of reducing agent (sodium thiosulfate), 3 lbs of complexor (sodium dichromate) and 18 gals of anionic emulsion polyacrylamide.

While preferred embodiments of the invention have been described herein, changes or modification in the method may be made by an individual skilled in the art without departing from the spirit and scope of the invention set forth in the appended claims.

What is claimed is:

1. A method of forming a chemical barrier in a subterranean formation penetrated by a well bore comprising the steps of:
   injecting under pressure a first fluid through the well bore into the formation at a first level, wherein the first fluid comprises either a viscosifying agent or a permeability reducing agent; and
   injecting under pressure, substantially simultaneous with the first fluid, a second fluid through the well bore into the formation at a second level, such that the first fluid forms a pressure barrier, wherein the second fluid comprises a sealant for forming the chemical barrier, wherein the migration of the second fluid through the pressure barrier is substantially inhibited.

2. The method of claim 1 wherein the injection pressures of the first and second fluids are substantially balanced.

3. The method of claim 1 wherein the first level is above the second level.

4. The method of claim 1 wherein the viscosifying agent is at least one member selected from a group consisting of polyacrylamides and hydratable polymers.

5. The method of claim 1 wherein the permeability reducing agent is at least one member selected from a group consisting of hydrophilic branched polymers, polyacrylamides, aluminum complexes and/or caustic in combination with rosin acids of fatty acids and, amphoteric polymeric materials.

6. The method of claim 1 further including the step of back-producing the first fluid.

7. The method of claim 1 wherein the sealant is at least one member selected from a group consisting of delayed silicate gel systems, delayed metal complexed aqueous polymers and in situ polymerization systems.

8. A method of forming a chemical barrier in a subterranean formation penetrated by a well bore comprising the steps of:
   preflushing the formation at a first level with a portion of a first fluid wherein the first fluid comprises either a viscosifying agent or a permeability reducing agent;
   injecting under pressure the remainder of the first fluid into the formation at the first level; and
   injecting under pressure, substantially simultaneous with the fluid of the first injection step, a second fluid through the well bore into the formation at a second level, such that the first fluid forms a pressure barrier, wherein the second fluid comprises a sealant for forming the chemical barrier, wherein the migration of the second fluid through the pressure barrier is substantially inhibited.

9. The method of claim 8 wherein the injection pressures of the first and second fluids are substantially balanced.

10. The method of claim 8 wherein the first level is above the second level.

11. The method of claim 8 wherein the sealant is at least one member selected from a group consisting of delayed silicate gel systems, delayed metal complexed aqueous polymers and in situ polymerization systems.

12. The method of claim 8 wherein the viscosifying agent comprises at least one member selected from a group consisting of polyacrylamides and hydratable polymers.

13. The method of claim 8 wherein the permeability reducing agent comprises at least one member selected from a group consisting of hydrophilic branched polymers, polyacrylamides, aluminum complexes and/or caustic in combination with rosin acids or fatty acids and, amphoteric polymeric materials.

14. A method of forming a chemical barrier in a subterranean formation penetrated by a well bore comprising the steps of:
   injecting under pressure a preflush fluid through the well bore into the formation at a first level, wherein the preflush fluid comprises either a viscosifying agent or a permeability reducing agent;
   injecting under pressure a first fluid through the well bore into the formation at the first level, wherein the first fluid contains no viscosifying agents or permeability reducing agents; and
   injecting under pressure, substantially simultaneous with the fluid of the second injecting step, a second fluid through the well bore into the formation at a second level, such that the preflush fluid and first fluid form a pressure barrier, wherein the second fluid comprises a sealant for forming the chemical barrier, wherein the migration of the second fluid through the pressure barrier is substantially inhibited.

15. The method of claim 14 wherein the injection pressures of the first and second fluids are substantially balanced.

16. The method of claim 14 wherein the first level is above the second level.

17. The method of claim 14 wherein the viscosifying agent comprises at least one member selected from a group consisting of polyacrylamides and hydratable polymers.

18. The method of claim 14 wherein the permeability reducing agent comprises at least one member selected from a group consisting of polyacrylamides, hydrophilic branched polymers, aluminum complexes and/or caustic in combination with rosin acids or fatty acids and, amphoteric polymeric materials.

19. The method of claim 14 wherein the sealant is at least one member selected from a group consisting of delayed silicate gel systems, delayed metal complexed aqueous polymers and in situ polymerization systems.

20. The method of claim 14 further including the step of back-producing the first fluid.

* * * * *